United States Patent
Moune et al.

(10) Patent No.: US 9,476,494 B2
(45) Date of Patent: Oct. 25, 2016

(54) FLEXIBLE EXTERNALLY TOOTHED GEAR FOR WAVE GEAR DEVICE

(75) Inventors: Stephanie Moune, Azumino (JP);
Noboru Takizawa, Azumino (JP)

(73) Assignee: HARMONIC DRIVE SYSTEMS INC., Shinagawa-Ku, Tokyo (JP)

(*) Notice: Subject to any disclaimer, the term of this patent is extended or adjusted under 35 U.S.C. 154(b) by 380 days.

(21) Appl. No.: 14/236,081

(22) PCT Filed: Aug. 17, 2011

(86) PCT No.: PCT/JP2011/004609
§ 371 (c)(1),
(2), (4) Date: Jan. 30, 2014

(87) PCT Pub. No.: WO2013/024511
PCT Pub. Date: Feb. 21, 2013

(65) Prior Publication Data
US 2014/0165758 A1    Jun. 19, 2014

(51) Int. Cl.
*F16H 49/00* (2006.01)

(52) U.S. Cl.
CPC ....... *F16H 49/001* (2013.01); *F16H 2049/003* (2013.01); *Y10T 74/19642* (2015.01)

(58) Field of Classification Search
CPC .................. F16H 49/001; F16H 2049/003
USPC ............................................. 74/640
See application file for complete search history.

(56) References Cited

U.S. PATENT DOCUMENTS

| | | | |
|---|---|---|---|
| 5,715,732 A | 2/1998 | Takizawa et al. | |
| 6,845,689 B2* | 1/2005 | Tanioka | F16H 49/001 74/640 |
| 7,249,536 B2* | 7/2007 | Kiyosawa | F16H 49/001 74/640 |
| 2008/0060473 A1 | 3/2008 | Li | |

FOREIGN PATENT DOCUMENTS

| | | |
|---|---|---|
| JP | 61-173851 U | 10/1986 |
| JP | 06-017888 A | 1/1994 |
| JP | 08-166051 A | 6/1996 |

(Continued)

OTHER PUBLICATIONS

International Search Report (PCT/ISA/210) mailed on Nov. 8, 2011, by the Japanese Patent Office as the International Searching Authority for International Application No. PCT/JP2011/004609.

*Primary Examiner* — William C Joyce
(74) *Attorney, Agent, or Firm* — Buchanan Ingersoll & Rooney PC (57) ABSTRACT

A cup-shaped flexible externally toothed gear of a wave gear device, wherein a diaphragm plate slopes from a diaphragm internal peripheral edge portion contiguous to a boss part toward a diaphragm external peripheral edge portion contiguous to a cylindrical body portion in a direction in which the diaphragm external peripheral edge portion is at greater distance from an open end of the cylindrical body portion with respect to an orthogonal plane orthogonal to a central axis line of the device. The length dimension of the diaphragm plate and the length dimension of the cylindrical body portion in the axial direction can be increased. Therefore, the fatigue strength of the diaphragm plate and the load capacity of the wave gear device in which the flexible externally toothed gear has been incorporated can be increased.

4 Claims, 5 Drawing Sheets

(56) References Cited

FOREIGN PATENT DOCUMENTS

| JP | 08-296703 A | 11/1996 |
|----|-------------|---------|
| JP | 2006-057684 A | 3/2006 |
| JP | 2006-097861 A | 4/2006 |

* cited by examiner

FLEXIBLE EXTERNALLY TOOTHED GEAR FOR WAVE GEAR DEVICE

TECHNICAL FIELD

The present invention relates to a flexible externally toothed gear having a novel shape enabling the load capacity of a wave gear device to be increased.

BACKGROUND ART

Figure 4:
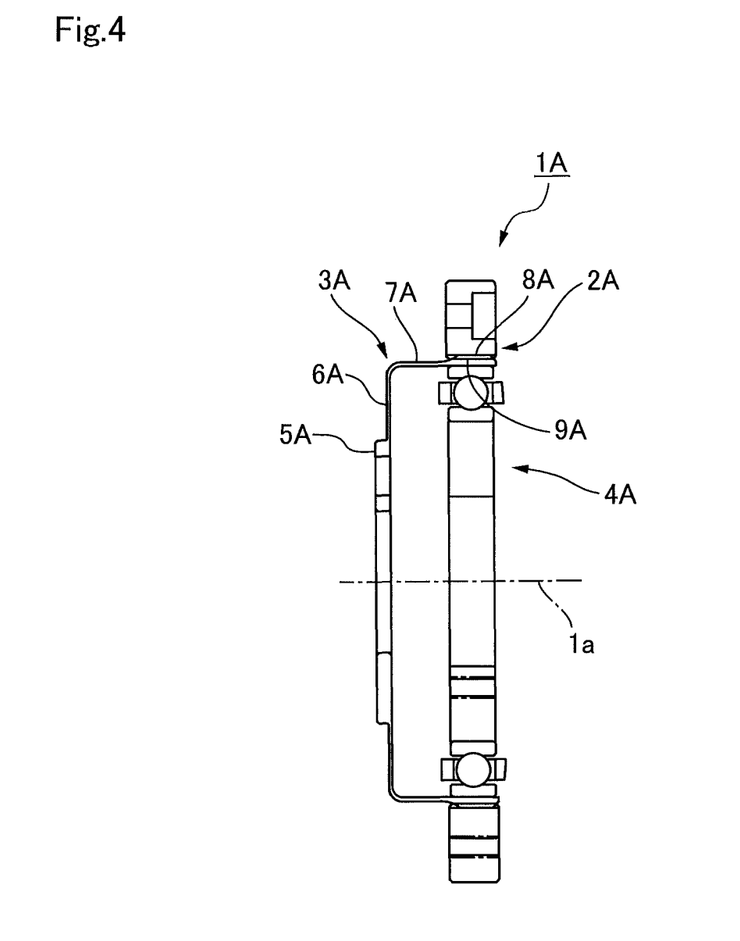
FIG. 4 A schematic longitudinal sectional view of a typical cup-type wave gear device according to the prior art.

A known type of wave gear device is a cup-type wave gear device, in which the flexible externally toothed gear has a cup-like shape, and FIG. 4 is a vertical cross-sectional view of a cup-type wave gear device. As shown in the drawing, a wave gear device 1A comprises a circular internally toothed rigid gear 2A, a cup-shaped flexible externally toothed gear 3A coaxially disposed within the internally toothed rigid gear 2A, and an ellipsoidally contoured wave generator 4A, fitted within the flexible externally toothed gear 3A, and adapted for flexing the flexible externally toothed gear 3A into an ellipsoidal shape and for making the flexible externally toothed gear to partially engage with the internally toothed rigid gear 2A.

The cup-shaped flexible externally toothed gear 3A is provided with: a constant-thickness boss 5A constituted by a disc-shaped rigid body; a diaphragm plate 6A extending radially outward from the round outer circumferential surface of the boss 5A, the plate being capable of flexing out of plane; a cylindrical cup body 7A, continuous with the round outer periphery of the diaphragm plate 6A, and extending in the direction of the central axis of the gearing and is capable of flexing radially; and external teeth 8A formed on an external circumferential part of the cylindrical cup body 7A near an open end.

The part of the cylindrical cup body 7A on which the external teeth 8A of the flexible externally toothed gear 3A are formed is ellipsoidally flexed by the wave generator 4A, and the external teeth 8A positioned at the two longitudinal ends of the ellipsoidal curve formed thereby engage with internal teeth 9A of the internally toothed rigid gear 2A. There is a difference of 2n (n being a positive integer; typically, n=1) in the numbers of teeth of the gears 2A, 3A; thus, when the wave generator 4A rotates, the position at which the two gears engage moves in a circumferential direction, generating relative rotation between the gears 2A, 3A corresponding to the difference in the number of teeth. By fixing one gear so as not to rotate and supporting the other gear in a freely rotatable state, the rotatably supported gear rotates at a rotational velocity that is considerably less than that of the wave generator 4A.

The cylindrical cup body 7A of the cup-shaped flexible externally toothed gear 3A is capable of being ellipsoidally flexed by the wave generator 4A, and has a circular cross-section prior to deformation, as shown in FIG. 5(a). After being ellipsoidally flexed by the wave generator 4A, the cylindrical cup body 7A is in a state of gradually expanding outwards from the side thereof nearer the diaphragm plate 6A toward the side thereof nearer an open end 7a when viewed in cross-section along the major axis of the ellipsoidal curve, as seen in FIG. 5(b). Conversely, the cylindrical cup body 7A contracts inward from the side of the diaphragm plate 6A toward the side of the open end, when viewed in cross-section along the minor axis of the ellipsoidal curve, as seen in FIG. 5(c).

In order to enable ellipsoidal flexing of the part of the cylindrical cup body 7A nearer the open end 7a, the cylindrical cup body 7A and the rigid boss 5A are connected by the diaphragm plate 6A. As shown in FIG. 5(b), the diaphragm plate 6A bends back centering on the part where it connects to the boss 5A as indicated by the arrow when viewed in cross-section along the major axis of the ellipsoidal curve. By contrast, when viewed in cross-section along the minor axis, the diaphragm plate 6A is slightly inclined toward the open end 7a, as shown in FIG. 5(c). As the parts of the cylindrical cup body 7A near the open end 7a are repeatedly radially flexed, repeated flexural deformation in a forward/backward direction along the gearing central axis 1a is generated in the diaphragm plate 6A. The diaphragm plate 6A is thereby subjected to torque transmission-induced shear stress and flexural stress arising from the flexural deformation.

The cross-sectional shape of the diaphragm plate 6A is thus engineered so as to allow the combined stress generated by the abovementioned stresses in the diaphragm plate 6A to be reduced and a high level of torque to be transmitted. Patent document 1 (JP-U S61-173851) proposes a cross-sectional shape for relieving the concentration of stress upon the part where the diaphragm plate connects to the boss. In patent document 2 (JP-A H06-017888), the thickness of the portion of the diaphragm plate connecting to the boss is at least three times the minimum thickness of the diaphragm plate, and the thickness gradually decreases in a radial outward direction away from the portion connecting to the boss, thereby preventing excessive stress being concentrated upon the cup-shaped flexible externally toothed gear, which has a short axial length. Patent document 3 (JP-A 2006-057684) proposes a method of defining the thickness of the various parts of a diaphragm plate in a cup-type wave gear device having a high gear ratio so as to increase load capacity.

PRIOR ART DOCUMENT

Patent Document (Patent Document 1) JP-U S61-173851
(Patent Document 2) JP-A H06-017888
(Patent Document 3) JP-A 2006-057684

SUMMARY OF THE INVENTION

Problems to be Solved by the Invention

In conventional cup-shaped flexible externally toothed gears, although consideration is given to the thickness of the diaphragm plate, especially changes in the thickness of the portion thereof connected to the boss, no consideration is given to the shape of the other parts of the diaphragm plate. Specifically, as disclosed in the abovementioned patent documents 1-3, the cross-sectional shape of a typical diaphragm plate is defined by a flat inner end surface that is continuous with an inner end surface of the boss and extends radially outward perpendicularly to the gearing central axis, and an outer end surface that is continuous with the round outer circumferential surface of the boss and extends radially outward, and extends overall in a perpendicular direction with respect to the gearing central axis (i.e., in the radial direction).

An object of the present invention is to propose a cup-shaped flexible externally toothed gear in which improvements have been made to the shape of the diaphragm plate, which was not considered in the prior art, in order to increase the load capacity of the wave gear device.

Means to Solve the Problems

In order to solve the abovementioned problem, a flexible externally toothed gear for a wave gear device according to the present invention is characterized in comprising:

a boss constituted by a disc- or ring-shaped rigid body;

a diaphragm plate that is continuous with an outer circumferential part of the boss and extends outward in a radial direction of the boss;

a cylindrical cup body, continuous with a round outer periphery part of the diaphragm plate, that extends in a direction of a central axis of the boss and is capable of flexing in a radial direction thereof; and external teeth formed on a part of an outer circumferential surface of the cylindrical cup body at a side of an open end of the cylindrical cup body;

the diaphragm plate being inclined with respect to a perpendicular plane that is perpendicular to the central axis, the diaphragm plate being inclined in a direction such that an outer periphery part of the diaphragm moves away from the open end of the cylindrical cup body, from an inner periphery part of the diaphragm continuous with the outer circumferential part of the boss toward the outer periphery part of the diaphragm continuous with the cylindrical cup body.

In the flexible externally toothed gear according to the present invention, the diaphragm plate is inclined with respect to the perpendicular plane perpendicular to the central axis, the diaphragm plate being inclined in a direction such that the outer periphery part moves away from the open end of the cylindrical cup body, from an inner periphery part near the boss toward an outer periphery part near the cylindrical cup body. This allows the length of the diaphragm plate from the boss to the cylindrical cup body to be increased, as well as the axial length of the cylindrical cup body, over cases in which the diaphragm plate extends perpendicularly to the central axis. In addition, the axial length of the cylindrical cup body can be greatly increased over cases in which the diaphragm plate is inclined with respect to the perpendicular plane perpendicular to the central axis in a direction opposite that in the present invention.

Specifically, the length of the diaphragm plate of the flexible externally toothed gear according to the present invention can be increased over that of a conventional flexible externally toothed gear having the same diameter, thereby allowing stress concentration upon the diaphragm plate to be relieved. In addition, both the length of the diaphragm plate and the axial direction length of the cylindrical cup body can be increased over those of a conventional flexible externally toothed gear having the same diameter and axial length, allowing for dramatic reduction in bearing counterforces generated by the wave generator, which greatly affect the performance of the wave gear device. As a result, the fatigue strength of the diaphragm plate can be increased, as can the load capacity of the wave gear device into which the flexible externally toothed gear is incorporated.

It is preferable that the diaphragm plate is tiltingly disposed within a range so as to fall within the thickness of the boss in the central axis direction. This allows the load capacity of the wave gear device to be increased without increasing the dimensions of the gearing.

In the diaphragm plate of the present invention, maximum stress is generated at the portion continuous with the boss; thus, it is preferable that the thickness of the diaphragm plate be set so as to gradually decrease from the inner periphery part toward the outer periphery part in order to relieve stress concentration.

The diaphragm plate can be radially extended outward from the part of the round outer circumferential surface of the boss nearer the open end. Generally, the diaphragm plate is formed so that the inner periphery part of the inner end surface of the diaphragm facing the open end of the cylindrical cup body is smoothly continuous with the inner end surface of the boss facing the open end of the cylindrical cup body, and the inner periphery part of the outer end surface of the diaphragm on the side of the diaphragm plate opposite that facing the open end of the cylindrical cup body is smoothly continuous with the round outer circumferential surface of the boss.

In this case, it is preferable that the cross-sectional shapes of the boss and the diaphragm plate when bisected by a plane along the central axis be defined as follows, as this will relieve stress concentration upon these parts. To wit, the shape of the inner end surfaces of the boss and the diaphragm plate are defined as follows.

(a1) The inner end surface of the boss is defined by an inner straight line perpendicular to the central axis.

(a2) The inner end surface of the diaphragm is defined by an inner convexly curved line that is smoothly continuous with an endpoint of the inner straight line and convexly curved inward, and an inner inclined straight line that is smoothly continuous with an endpoint of the inner-side convexly curved line.

(a3) The inner inclined straight line is inclined at a first angle of inclination with respect to the inner straight line defining the inner end surface of the boss in a direction such that an endpoint thereof nearer the cylindrical cup body moves away from the inner end surface of the boss with respect to the endpoint nearer the boss.

The shape of the outer end surfaces of the boss and the diaphragm plate are defined as follows.

(b1) The outer end surface of the boss on the side opposite the inner end surface of the boss is defined by an outer straight line that is perpendicular to the central axis.

(b2) The round outer circumferential surface of the boss continuous with the outer periphery of the outer end surface of the boss is defined by an outer circumference straight line that bends back to extend from an endpoint of the outer straight line toward the inner end surface of the boss.

(b3) The outer end surface of the diaphragm is defined by a first concavely curved line that is smoothly continuous with an endpoint of the outer circumference straight line and curves concavely inward, a second concavely curved line that is smoothly continuous with an endpoint of the first concavely curved line and curves concavely inward, a third concavely curved line that is smoothly continuous with an endpoint of the second concavely curved line, and an outer inclined straight line that is smoothly continuous with an endpoint of the third concavely curved line.

(b4) The radii of curvature of the first concavely curved line, the second concavely curved line, and the third concavely curved line are set so as to increase in that order.

(b5) The outer inclined straight line is inclined at a second angle of inclination, smaller than the first angle of inclination, in the same direction as the inner inclined straight line.

Effect of the Invention

In the flexible externally toothed gear according to the present invention, the diaphragm plate is inclined with respect to a radial direction perpendicular to the central axis from an inner periphery part near the boss toward an outer periphery part near the cylindrical cup body in a direction such that the outer periphery part moves away from the open end of the cylindrical cup body. Thus, the length of the diaphragm plate of the flexible externally toothed gear can be increased over that of a conventional flexible externally toothed gear having the same diameter, thereby allowing stress concentration upon the diaphragm plate to be relieved. In addition, the length of the diaphragm plate and the length of the cylindrical cup body can be increased over those of a conventional flexible externally toothed gear having the same diameter and axial length, allowing for dramatic reduction in bearing counterforces generated by the wave generator, which greatly affect the performance of the wave gear device. As a result, in accordance with the present invention, the fatigue strength of the diaphragm plate can be increased, as can the load capacity of the wave gear device into which the flexible externally toothed gear is incorporated.

BRIEF DESCRIPTION OF THE DRAWINGS

FIG. 2 (a) is a half cross-sectional view of a flexible externally toothed gear of the cup-type wave gear device shown in FIG. 1, and (b) is a half cross-sectional view of a conventional flexible externally toothed gear.

BEST MODE FOR CARRYING OUT THE INVENTION

An embodiment of a cup-type wave gear device to which the present invention is applied will be described hereafter with reference to the drawings.

FIG. 1(a) is a schematic longitudinal sectional view of a cup-type wave gear device according to the present embodiment, and FIG. 1(b) is a schematic configuration illustration bisected by a plane orthogonal to the gearing central axis.

Figure 5:
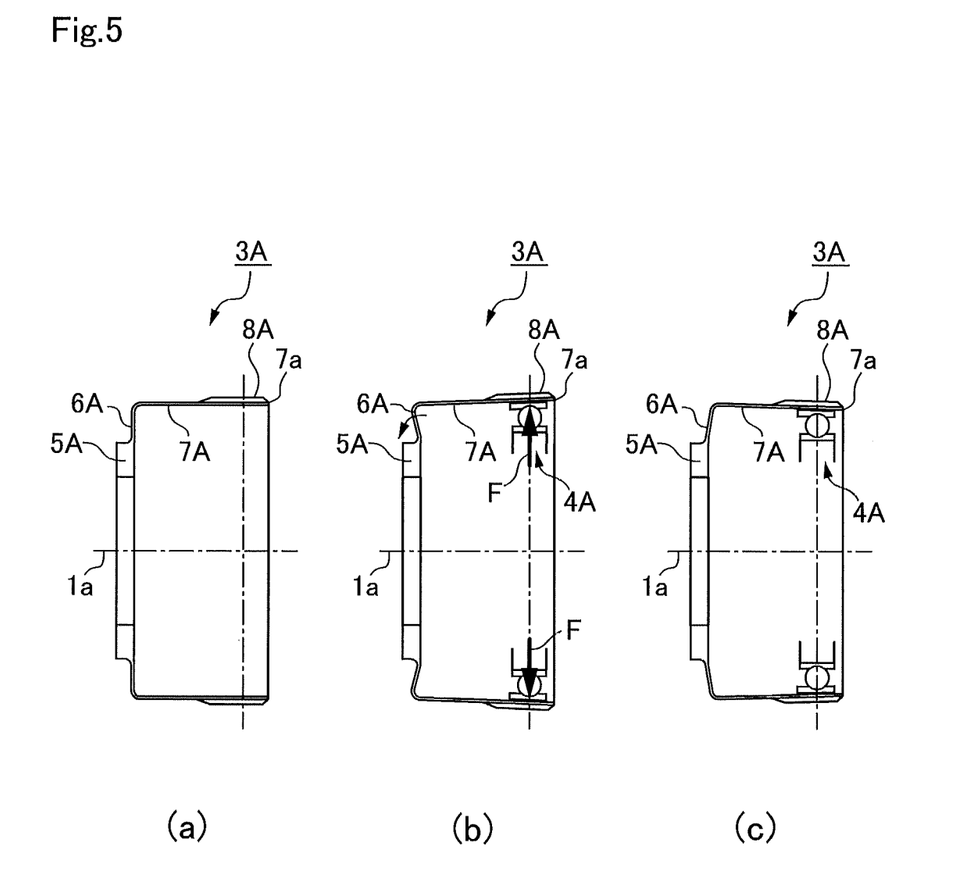
FIG. 5 An illustration of a cup-shaped flexible externally toothed gear in a flexed state, (a) being a longitudinal sectional view of a state before deformation, (b) being an illustration of a state of deformation in a cross section along the major axis after deformation into an ellipsoidal shape, and (c) is an illustration of a state of deformation in a cross section along the minor axis after deformation into an ellipsoidal shape.

A cup-type wave gear device 1 (hereafter simply a "wave gear device 1") has a basic configuration similar to that of the conventional wave gear device 1A shown in FIG. 4 and FIG. 5, and comprises a ring-shaped internally toothed rigid gear 2, a cup-shaped flexible externally toothed gear 3 coaxially disposed within the internally toothed rigid gear 2, and a wave generator 4 fitted into the flexible externally toothed gear 3. The wave generator 4 has an ellipsoidal outline, and flexes the flexible externally toothed gear 3 into an ellipsoidal shape and partially engages it with the internally toothed rigid gear 2.

Figure 1:
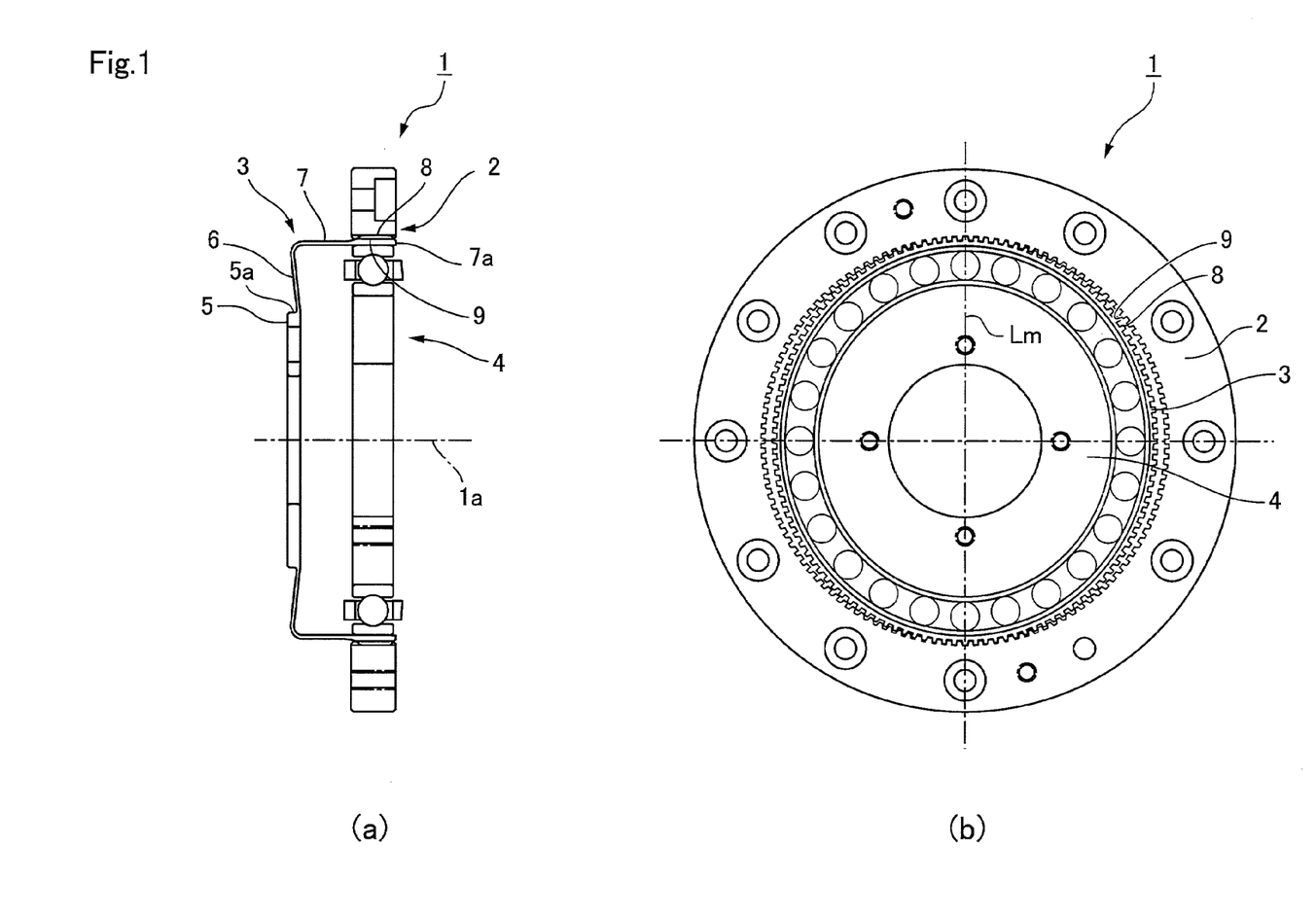
FIG. 1 A schematic longitudinal sectional view and schematic configuration illustration showing a cup-type wave gear device to which the present invention is applied.

The cup-shaped flexible externally toothed gear 3 has: a boss 5 of a constant thickness constituted by a ring-shaped rigid body; a diaphragm plate 6 extending radially outward from a round outer circumferential surface 5a of the boss 5, the plate being capable of flexing out of plane; a cylindrical cup body 7, continuous with the round outer periphery of the diaphragm plate 6, that extends in the direction of the gearing central axis 1a and is capable of flexing radially; and external teeth 8 formed on a part of the outer circumferential surface of the cylindrical cup body 7 at the side of an open end 7a. The external teeth 8 engage with internal teeth 9 of the internally toothed rigid gear 2 at positions on both sides of the major axis Lm of the ellipsoidal curve.

Figure 2:
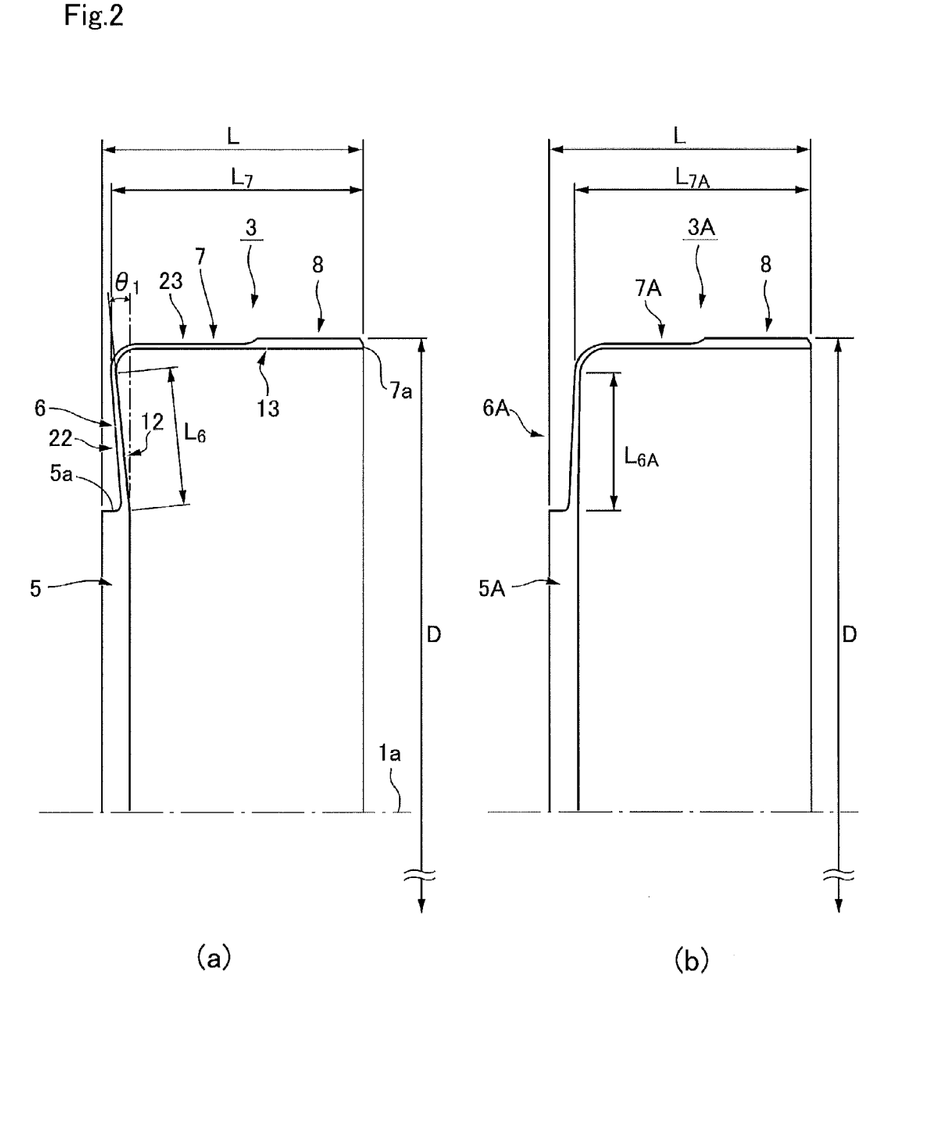
Figure 3:
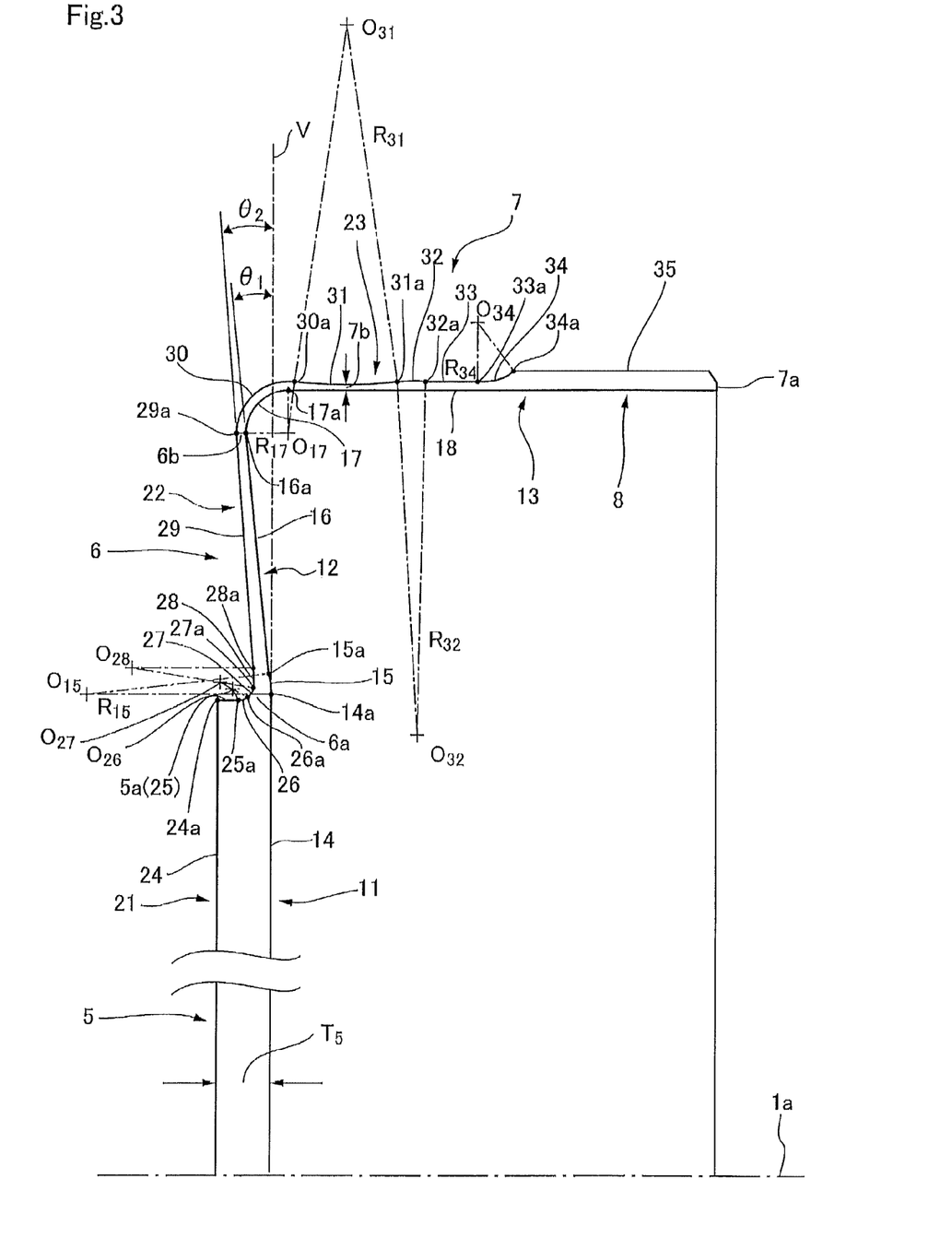
FIG. 3 A enlarged partial cross-sectional view of the flexible externally toothed gear shown in FIG. 2(a).

FIG. 2 is a half cross-sectional view of the cup-shaped flexible externally toothed gear 3 being compared to a conventional flexible externally toothed gear 3A, and FIG. 3 is a partially enlarged cross-sectional view of the flexible externally toothed gear 3. As shown in the drawings, the diaphragm plate 6 of the flexible externally toothed gear 3 is inclined with respect to a perpendicular plane V that is perpendicular to the gearing central axis 1a. The diaphragm plate is inclined in a direction such that the outer periphery part 6b of the diaphragm moves away from the open end 7a of the cylindrical cup body 7 from the inner periphery part 6a of the diaphragm. The outer periphery part 6b of the diaphragm being continuous with the cylindrical cup body 7, and the inner periphery part 6a is continuous with the round outer circumferential surface 5a of the boss 5. The thickness of the diaphragm plate 6 gradually decreases from the inner periphery part 6a of the diaphragm to the outer periphery part 6b of the diaphragm.

The diaphragm plate 6 extends outward from a part of the round outer circumferential surface 5a of the boss 5, the part being offset to the side of the open end 7a. Specifically, the diaphragm plate 6 is formed so that the inner periphery part of the inner end surface 12 of the diaphragm plate 6 at the side of the open end 7a is smoothly continuous with the inner end surface 11 of the boss 5 at the side of the open end 7a, and the inner periphery part of the outer end surface 22 of the diaphragm plate 6 at the side opposite the open end 7a is smoothly continuous with the round outer circumferential surface 5a of the boss 5.

More specifically, the cross-sectional shape of the various parts of the flexible externally toothed gear 3 when bisected by a plane along the gearing central axis 1a of the flexible externally toothed gear 3 is defined as follows.

First, the inner end surface 11 of the boss 5 is defined by an inner straight line 14 perpendicular with the gearing central axis 1a. The inner end surface 12 of the diaphragm is defined by an inner convexly curved line 15 that is smoothly continuous with an endpoint 14a of the inner straight line 14, and an inner inclined straight line 16 that is smoothly continuous with an endpoint 15a of the inner convexly curved line 15. The inner convexly curved line 15 is a curved line having a radius of curvature R15 with a center O15 positioned outside. An inner circumferential surface 13 of the cylindrical cup body 7 is defined by an inner concavely curved line 17 that is smoothly continuous with an endpoint 16a of the inner inclined straight line 16, and an inner circumferential straight line 18 that is smoothly continuous with an endpoint 17a of the inner concavely curved line 17. The inner concavely curved line 17 is a curved line having a radius of curvature R17 with a center O17 positioned inside. The inner circumferential straight line 18 is a straight line parallel with the gearing central axis 1a.

By contrast, an outer end surface 21 of the boss is defined by an outer straight line 24 perpendicular to the gearing central axis 1a. The round outer circumferential surface 5a of the boss 5 continuous with the outer periphery of the outer end surface 21 of the boss is defined by an outer circumference straight line 25 bending back at a roughly right angle to extend from an endpoint 24a of the outer straight line 24 toward the inner end surface 11 of the boss.

The outer end surface 22 of the diaphragm is defined by a first concavely curved line 26 that is smoothly continuous with an endpoint 25a of the outer circumference straight line 25 and curves concavely inward, a second concavely curved line 27 that is smoothly continuous with an endpoint 26a of the first concavely curved line 26 and curves concavely inward, a third concavely curved line 28 that is smoothly continuous with an endpoint 27a of the second concavely curved line 27, and an outer inclined straight line 29 that is smoothly continuous with an endpoint 28a of the third concavely curved line 28. The first concavely curved line 26 is a curved line having a radius of curvature R26 with a center O26 positioned outside, the second concavely curved line 27 is a curved line having a radius of curvature R27 with a center O27 positioned outside, and the third concavely curved line 28 is a curved line having a radius of curvature R28 with a center O28 positioned outside. The radii of curvature of these curved lines have the following relationship. The radius of curvature R15 of the inner convexly curved line 15 is greater than the radius of curvature R28. R26 <R27 <R28

An outer circumferential surface 23 of the cylindrical cup body 7 is defined by a convexly curved line 30 that is smoothly continuous with an endpoint 29a of the outer inclined straight line 29, a concavely curved line 31 that is smoothly continuous with an endpoint 31a of the convexly curved line 30, a convexly curved line 32 that is smoothly continuous with an endpoint 31a of the concavely curved line 31, a straight line 33 that is smoothly continuous with an endpoint 32a of the convexly curved line 32, a concavely curved line 34 that is smoothly continuous with an endpoint 33a of the straight line 33, and a contour line 35 of the tips of the external teeth 8 extending from an endpoint 34a of the concavely curved line 34. The convexly curved line 30 is a curved line having a radius of curvature R30 with a center O17 positioned inside, the concavely curved line 31 is a curved line having a radius of curvature R31 having a center O31 positioned outside, the convexly curved line 32 is a curved line having a radius of curvature R32 having a center O32 positioned outside, and the concavely curved line 34 is a curved line having a radius of curvature R34 with a center O34 positioned outside. The straight line 33 is a straight line parallel with the gearing central axis 1a.

The inner inclined straight line 16 of the diaphragm plate 6 is inclined at a first angle of inclination θ1 with respect to the inner straight line 14 defining the inner end surface 11 of the boss in a direction such that the endpoint 16a nearer the cylindrical cup body is positioned toward the outer end surface 21 of the boss with respect to the endpoint 15a nearer the boss. By contrast, the outer inclined straight line 29 is inclined at a second angle of inclination θ2, smaller than the first angle of inclination θ1, in the same direction as the inner inclined straight line 16. The diaphragm plate 6 is preferably inclined so as to fall within the range of the thickness T5 of the boss 5.

The cross-sectional shapes of the boss 5, the diaphragm plate 6, and the cylindrical cup body 7 are defined as described above. Thus, the thickness T5 of the boss 5 is greatest, and the thickness of the inner periphery part 6a of the diaphragm plate 6 continuous therewith is gradually reduced by the inner convexly curved line 15 and the outer first through third concavely curved lines 26-28. The thickness is also gradually reduced by the inner inclined straight line 16 and outer inclined straight line 29, which have different angles, from the inner periphery part 6a toward the outer periphery part 6b.

The part of the cylindrical cup body 7 contacting the side of the diaphragm plate 6 is defined by the curved lines 17, 30 having the same center O17 and the same curvature, and thus has an identical thickness. The inner side of the part of the cylindrical cup body 7 connected thereto is defined by the inner circumferential straight line 18, and the outer side by the concavely curved line 31, thus forming a minimum thickness part 7b of the cylindrical cup body 7 at an intermediate position.

In the cup-shaped flexible externally toothed gear 3 of the wave gear device 1, as discussed above, the diaphragm plate 6 is inclined as a whole with respect to the perpendicular plane V perpendicular to the gearing central axis 1a from the inner periphery part 6a nearer the boss 5 toward the outer periphery part 6b nearer the cylindrical cup body 7 so that the outer periphery part 6b is positioned further outward than the inner periphery part 6a.

It is thus possible to increase the length of the diaphragm plate 6 from the boss 5 to the cylindrical cup body 7, as well as the axial length of the cylindrical cup body 7, over cases in which the diaphragm plate 6 extends perpendicularly to the gearing central axis 1a. In addition, the axial length of the cylindrical cup body 7 can be greatly increased over cases in which the diaphragm plate 6 is inclined with respect to the perpendicular plane V perpendicular to the gearing central axis 1a in a direction opposite that in the present invention.

That is, the length L6 of the diaphragm plate 6 of the flexible externally toothed gear 3 according to the present embodiment shown in FIG. 2(a) can be greatly increased over the length L6A of the conventional flexible externally toothed gear 3A shown in FIG. 2(b), which has the same diameter D and the same axial length L, and the axial length L7 of the cylindrical cup body 7 can be increased over the length L7A of the conventional gear 3A. As a result, stress concentration in the diaphragm plate 6 can be relieved and generated stress can be reduced, and bearing counterforce F (see FIG. 5(b)) generated by the wave generator 4, which greatly affects the performance of the wave gear device 1, can be reduced. As a result, the strength fatigue of the diaphragm plate 6 can be increased, as can the load capacity of the wave gear device 1 into which the flexible externally toothed gear 3 is incorporated.

The invention claimed is:

1. A flexible externally toothed gear for a wave gear device comprising:
    a boss constituted by a disc- or ring-shaped rigid body;
    a diaphragm plate that is continuous with an outer circumferential part of the boss and extends outward in a radial direction of the boss;
    a cylindrical cup body, continuous with a round outer periphery part of the diaphragm plate, that extends in a direction of a central axis of the boss and is capable of flexing in a radial direction thereof; and
    external teeth formed on a part of an outer circumferential surface of the cylindrical cup body at a side of an open end of the cylindrical cup body;
    the diaphragm plate being inclined with respect to a perpendicular plane that is perpendicular to the central axis, the diaphragm plate being inclined in a direction such that an outer periphery part of the diaphragm plate moves away from the open end of the cylindrical cup body, from an inner periphery part of the diaphragm plate toward the outer periphery part of the diaphragm plate, the outer periphery part of the diaphragm plate being continuous with the cylindrical cup body, and the inner periphery part of the diaphragm plate being continuous with the outer circumferential part of the boss, wherein:

an inner end surface of the diaphragm plate on a side of the open end is smoothly continuous with an inner end surface of the boss on a side of the open end, and an outer end surface of the diaphragm plate on an opposite side to the open end is smoothly continuous with a round outer circumferential surface of the boss, and wherein, and when bisected by a plane along the central axis, the inner end surface of the boss is defined by an inner straight line perpendicular to the central axis, the inner end surface of the diaphragm plate is defined by an inner convexly curved line that is smoothly continuous with an endpoint of the inner straight line and convexly curved inward, and an inner inclined straight line that is smoothly continuous with an endpoint of the inner convexly curved line, the inner inclined straight line is inclined at a first angle of inclination with respect to the inner straight line defining the inner end surface of the boss in a direction such that an endpoint thereof nearer the cylindrical CUP body moves away from the inner end surface of the boss with respect to the endpoint nearer the boss, an outer end surface of the boss on a side opposite the inner end surface of the boss is defined by an outer straight line that is perpendicular to the central axis, a round outer circumferential surface of the boss continuous with an outer periphery of the outer end surface of the boss is defined by an outer circumference straight line that bends back to extend from a endpoint of the outer straight line toward the inner end surface of the boss, the outer end surface of the diaphragm plate is defined by a concavely curved line that tis smoothly continuous with an endpoint of the outer circumference straight line and curves concavely inward, a second concavely curved line that is smoothly continuous with an endpoint of the first concavely curved line and curves concavely inward, a third concavely curved line that is smoothly continuous with an endpoint of the second concavely curved line, and an outer inclined straight line that is smoothly continuous with an endpoint of the third concavely curved line, the radii of curvature of the first concavely curved line, the second concavely curved line, and the third concavely curved line are set so as to increase in that order, and the outer inclined straight line is inclined at a second angle of inclination, smaller than the first angle of inclination, in a same direction as the inner inclined straight line.

2. The flexible externally toothed gear for a wave gear device according to claim 1, wherein the diaphragm plate is tiltingly disposed within a range so as to fall within a thickness of the boss in the direction of the central axis.

3. The flexible externally toothed gear for a wave gear device according to claim 1, wherein a thickness of the diaphragm plate gradually decrease from the inner periphery part thereof toward the outer periphery part thereof.

4. A wave gear device having:

an internally toothed rigid gear;

a flexible externally toothed gear coaxially disposed within the internally toothed rigid gear; and a wave generator fitted into the flexible externally toothed gear for flexing the flexible externally toothed gear into an non-circular shape and partially engaging with the internally toothed rigid gear, wherein engagement portions of the internally toothed rigid gear and the flexible externally toothed gear move circumferentially as the wave generator rotates, whereby generating relative rotation between the two gears according to a difference in number of teeth therebetween, the wave gear device having the flexible externally toothed gear according to claim 1.

\* \* \* \* \*